United States Patent
Yehaskel et al.

(10) Patent No.: US 9,766,856 B2
(45) Date of Patent: *Sep. 19, 2017

(54) RULE-BASED SYSTEM AND METHOD TO ASSOCIATE ATTRIBUTES TO TEXT STRINGS

(71) Applicant: LEAF GROUP LTD., Santa Monica, CA (US)

(72) Inventors: David M. Yehaskel, Austin, TX (US); Henrik M. Kjallbring, Austin, TX (US)

(73) Assignee: LEAF GROUP LTD., Santa Monica, CA (US)

(*) Notice: Subject to any disclaimer, the term of this patent is extended or adjusted under 35 U.S.C. 154(b) by 91 days.

This patent is subject to a terminal disclaimer.

(21) Appl. No.: 14/563,360

(22) Filed: Dec. 8, 2014

(65) Prior Publication Data

US 2015/0095353 A1 Apr. 2, 2015

Related U.S. Application Data

(63) Continuation of application No. 12/828,200, filed on Jun. 30, 2010, now Pat. No. 8,954,404.

(Continued)

(51) Int. Cl.
| | |
|---|---|
| *G06F 7/00* | (2006.01) |
| *G06F 17/00* | (2006.01) |
| *G06F 7/24* | (2006.01) |
| *G06F 17/27* | (2006.01) |
| *G06F 17/30* | (2006.01) |

(52) U.S. Cl.
CPC ............ *G06F 7/24* (2013.01); *G06F 17/2795* (2013.01); *G06F 17/30634* (2013.01); *G06F 17/30864* (2013.01); *G06F 17/30867* (2013.01)

(58) Field of Classification Search
None
See application file for complete search history.

(56) References Cited

U.S. PATENT DOCUMENTS

| | | |
|---|---|---|
| 5,974,412 A | 10/1999 | Hazlehurst et al. |
| 6,199,061 B1 | 3/2001 | Blewett et al. |

(Continued)

FOREIGN PATENT DOCUMENTS

| | | |
|---|---|---|
| KR | 1020040063641 | 7/2004 |
| WO | 2011106197 | 9/2011 |

(Continued)

OTHER PUBLICATIONS

Dec. 11, 2009, as printed on, "Digg—Wikipedia, the free encyclopedia".

(Continued)

*Primary Examiner* — Jau-Shya Meng
(74) *Attorney, Agent, or Firm* — Greenberg Traurig, LLP

(57) ABSTRACT

A method implemented in a data processing system includes receiving a plurality of text strings. A plurality of rules are applied to the text strings. If a condition specified in one of the rules exists in a given text string, one or more attributes are associated to that text string as metadata. One or more of the text strings are selected, using the metadata, as a potential title for the content. A final title is prepared based on the potential title, and the content is published online under the final title.

16 Claims, 12 Drawing Sheets

| Rule | Deliver | Intent | Query | Tags |
|---|---|---|---|---|
| soil%","soils with") and NOT InDictionary("all-geo") | | | | |
| EndsWith("soils") and Contains("layers","ratio","stability","minerals") | Y | Y | I | outdoors,about,factsheet |
| Contains("lawn care") | | | | outdoors,gardening |
| Contains("secrets") and Contains("garden%","yard","landscaping") | Y | Y | I | gardening,tips,strategy |
| Contains("landscaping with","landscaping for","landscaping the","landscaping a") and NOT InDictionary("all-geo") | Y | Y | I | gardening,tips,strategy,how-to |
| Contains("for gardens") | | | | gardening |
| Contains("vegetable gardens") and StartsWithPos("VBG","W%") | Y | Y | I | gardening,how-to,strategy |
| Contains("flowers that","flowers which") | Y | Y | I | flowers,gardening |
| Contains("plants that","plants which") | Y | Y | I | plants,gardening |
| InDictionary("garden-plants-latin") and Contains("name","names","medical use%") | Y | Y | I | gardening,plants,about,factsheet |
| Contains("plant% list%") | Y | Y | I | gardening,list |
| Contains(2,"grow%"," aloe") | Y | Y | I | gardening,plants,about,care |
| InDictionary(2,"garden-verbs","garden-plants") AND NOT InDictionary(1,"all-geo","garden-bad") | Y | Y | I | gardening,plants |
| Contains("repel") and InDictionary("all-animals") | Y | Y | I | animals,how-to,strategy |

Related U.S. Application Data

(60) Provisional application No. 61/307,702, filed on Feb. 24, 2010.

(56) References Cited

U.S. PATENT DOCUMENTS

| | | | |
|---|---|---|---|
| 6,266,570 | B1 | 7/2001 | Hocherl et al. |
| 7,222,078 | B2 | 5/2007 | Abelow |
| 7,574,433 | B2* | 8/2009 | Engel ............... G06F 17/30011 |
| 7,599,922 | B1 | 10/2009 | Chen et al. |
| 7,617,203 | B2 | 11/2009 | Awadallah et al. |
| 7,636,732 | B1 | 12/2009 | Nielsen |
| 7,788,131 | B2 | 8/2010 | Nong et al. |
| 7,885,952 | B2 | 2/2011 | Chellapilla et al. |
| 8,037,063 | B2 | 10/2011 | Oldham et al. |
| 8,041,596 | B2 | 10/2011 | Graham et al. |
| 8,166,045 | B1* | 4/2012 | Mazumdar ........ G06F 17/30864 707/713 |
| 8,380,710 | B1* | 2/2013 | Finne ................. G06F 17/3053 707/723 |
| 8,620,944 | B2 | 12/2013 | Yehaskel et al. |
| 8,909,623 | B2 | 12/2014 | Yehaskel et al. |
| 8,954,404 | B2 | 2/2015 | Yehaskel et al. |
| 2002/0073019 | A1 | 6/2002 | Deaton |
| 2004/0049499 | A1 | 3/2004 | Nomoto et al. |
| 2004/0249808 | A1 | 12/2004 | Azzam et al. |
| 2005/0055341 | A1 | 3/2005 | Haahr et al. |
| 2006/0074853 | A1 | 4/2006 | Liu et al. |
| 2006/0155656 | A1 | 7/2006 | Kreder, III et al. |
| 2007/0027845 | A1 | 2/2007 | Dettinger et al. |
| 2007/0083506 | A1 | 4/2007 | Liddell et al. |
| 2007/0239542 | A1 | 10/2007 | Shapiro |
| 2007/0266342 | A1 | 11/2007 | Chang et al. |
| 2008/0052278 | A1 | 2/2008 | Zlotin et al. |
| 2008/0104542 | A1 | 5/2008 | Cohen et al. |
| 2008/0133498 | A1 | 6/2008 | Patel |
| 2008/0154847 | A1 | 6/2008 | Chellapilla et al. |
| 2008/0201251 | A1 | 8/2008 | Magdon-Ismail et al. |
| 2008/0208815 | A1 | 8/2008 | Taylor |
| 2009/0037421 | A1 | 2/2009 | Gamble |
| 2009/0077124 | A1 | 3/2009 | Spivack et al. |
| 2009/0089044 | A1* | 4/2009 | Cooper ................ G06F 17/275 704/9 |
| 2009/0112835 | A1* | 4/2009 | Elder ...................... F16K 15/16 |
| 2009/0119268 | A1 | 5/2009 | Bandaru et al. |
| 2009/0182718 | A1 | 7/2009 | Waclawik et al. |
| 2009/0228439 | A1 | 9/2009 | Manolescu et al. |
| 2009/0248510 | A1 | 10/2009 | Ahluwalia |
| 2009/0254543 | A1 | 10/2009 | Ber et al. |
| 2009/0292687 | A1 | 11/2009 | Fan et al. |
| 2009/0327223 | A1 | 12/2009 | Chakrabarti et al. |
| 2010/0082452 | A1 | 4/2010 | Speers et al. |
| 2010/0131902 | A1 | 5/2010 | Teran et al. |
| 2010/0138421 | A1 | 6/2010 | Oldham et al. |
| 2010/0211564 | A1 | 8/2010 | Cohen et al. |
| 2010/0250335 | A1 | 9/2010 | Cetin et al. |
| 2011/0093488 | A1 | 4/2011 | Amacker et al. |
| 2011/0145058 | A1 | 6/2011 | Liu et al. |
| 2011/0173177 | A1 | 7/2011 | Junqueira et al. |
| 2011/0208758 | A1 | 8/2011 | Yehaskel et al. |
| 2011/0213655 | A1 | 9/2011 | Henkin et al. |
| 2011/0246378 | A1 | 10/2011 | Prussack et al. |
| 2011/0251901 | A1 | 10/2011 | Kwon et al. |
| 2011/0320444 | A1 | 12/2011 | Yehaskel et al. |
| 2012/0059849 | A1 | 3/2012 | Yehaskel et al. |
| 2012/0072435 | A1 | 3/2012 | Han |
| 2015/0058117 | A1 | 2/2015 | Yehaskel et al. |

FOREIGN PATENT DOCUMENTS

| | | |
|---|---|---|
| WO | 2012006021 | 1/2012 |
| WO | 2012033561 | 3/2012 |

OTHER PUBLICATIONS

International Patent Application Serial No. PCT/US2011/024875, International Search Report and Written Opinion, Sep. 30, 2011.
International Patent Application Serial No. PCT/US2011/024878, International Search Report and Written Opinion, Sep. 9, 2011.
International Patent Application Serial No. PCT/US2011/042021, International Search Report and Written Opinion, Feb. 2, 2012.
International Patent Application Serial No. PCT/US2011/042460, International Search Report and Written Opinion, Feb. 17, 2012.
Orenstein, David, "Stanford Software is Gaining the Sophistication to Comprehend What Humans Write", Stanford Report, Feb. 18, 2010, 2 pages. Available at: http://news.stanford.edu/news/2010/february15/manning-aaas-computers-021910.html.
Park, Hong-Won, "Natural Language Based Information Retrieval System Considering the Focus of the Question", Korean Institute of Information Scientists and Engineers Conference, Oct. 10, 2009, abstract.
Rule-base System and Method to Associate Attributes to Text Strings, U.S. Appl. No. 12/828,200, filed Jun. 30, 2010, David Yehaskel, et al, Non Final Action Mailed, Apr. 22, 2014.
System and Method for Evaluating Search Queries to Identify Titles for Content Production, U.S. Appl. No. 12/826,524, filed Jun. 29, 2010, David Yehaskel, et al, Notice of allowance Mailed—Application Received in Office of Publications, Aug. 7, 2014.
Content Production, U.S. Appl. No. 14/536,397, filed Nov. 7, 2014, David Yehaskel, et al, Notice of Allowance Mailed—Application Received in Office of Publications, Jan. 23, 2017.
Systems and Methods for Keyword Analyzer, David Yehaskel, et al, U.S. Pat. No. 8,620,944, Dec. 31, 2013.

\* cited by examiner

| Rule | Deliver | Intent | Query | Tags |
|---|---|---|---|---|
| Contains("plant nurser%") and InDictionary("all-geo") | N | Y | | local,gardening,plants,yellowpages,shopping |
| InDictionary(2,"garden-plants","garden-modifiers") and NOT InDictionary("garden-bad","beauty-bodyparts") | | | | outdoors,gardening |
| InDictionary(2,"garden-broad","garden-modifiers") and NOT InDictionary("garden-bad") | | | | outdoors,gardening |
| InDictionary(2,"garden-broad","garden-plants") AND NOT InDictionary("garden-bad","med-bodyparts") | | | | outdoors,gardening,plants |
| InDictionary(2,"garden-broad","garden-plants-latin") AND NOT InDictionary("garden-bad") | | | | outdoors,gardening,plants |
| InDictionary(2,"garden-broad","garden-verbs") AND NOT InDictionary("garden-bad") AND NOT Contains("lawn care") | | | | outdoors,gardening |
| InDictionary(2,"garden-features","garden-modifiers") AND NOT InDictionary("garden-bad") | | | | outdoors,gardening |
| InDictionary(2,"garden-features","garden-verbs") AND NOT InDictionary("garden-bad") | Y | | | outdoors,gardening |
| InDictionary(2,"garden-modifiers","garden-plants") AND NOT InDictionary("garden-bad","games-video") | | | | outdoors,gardening,plants |
| InDictionary(2,"garden-modifiers","garden-plants-latin") AND NOT InDictionary("garden-bad","games-video") | | | | outdoors,gardening,plants |
| InDictionary(2,"garden-plants-latin","garden-problems") AND NOT InDictionary("med-diseases","garden-bad") | Y | Y | | outdoors,gardening,plants,problems,about |
| Contains(2,"leaf","identif%") | Y | Y | I | plants,identification,factsheet,informational,how-to |
| InDictionary(2,"garden-features","garden-plants") AND NOT InDictionary("garden-bad") | Y | Y | | outdoors,gardening |
| InDictionary(2,"garden-features","garden-plants-latin") AND NOT InDictionary("garden-bad") | Y | Y | | outdoors,gardening |
| In Dictionary(2,"garden-features","words-verb-ing") | Y | Y | | gardening,outdoors,howto,informational |
| Contains("soil ph","soil requirements","in soil%","of | Y | Y | I | outdoors,about,factsheet,gardening |

FIG. 2A

| Rule | Deliver | Intent | Query | Tags |
|---|---|---|---|---|
| soil%","soils with") and NOT InDictionary("all-geo") | Y | | | outdoors,about,factsheet |
| EndsWith("soils") and Contains("layers","ratio","stability","minerals") | | Y | | outdoors,gardening |
| Contains("lawn care") | Y | Y | | gardening,tips,strategy |
| Contains("secrets") and Contains("garden%","yard","landscaping") | Y | Y | | gardening,tips,strategy,how-to |
| Contains("landscaping with","landscaping for","landscaping the","landscaping a") and NOT InDictionary("all-geo") | Y | | | gardening |
| Contains("for gardens") | Y | Y | | gardening,how-to,strategy |
| Contains("vegetable gardens") and StartsWithPos("VBG","W%") | Y | Y | | flowers,gardening |
| Contains("flowers that","flowers which") | Y | Y | | plants,gardening |
| Contains("plants that","plants which") | Y | Y | | gardening,plants,about,factsheet |
| InDictionary("garden-plants-latin") and Contains("name","names","medical use%") | | Y | | gardening,list |
| Contains("plant% list%") | Y | Y | | gardening,plants,about,care |
| Contains(2,"grow%"," aloe") | Y | Y | | gardening,plants |
| InDictionary(2,"garden-verbs","garden-plants") AND NOT InDictionary(1,"all-geo","garden-bad") | Y | | | |
| Contains("repel") and InDictionary("all-animals") | Y | Y | | animals,how-to,strategy |

FIG. 2B

| | computers-hardware | exercise-muscles-bodyparts | garden-plants-latin |
|---|---|---|---|
| | computers-internet | finance-business-types | garden-problems |
| amounts-comp | computers-pcfiles | finance-general | garden-verbs |
| amounts-dist | computers-problems | finance-govt | geography |
| amounts-mass | computers-software | finance-issues | hobbies-general |
| amounts-power | computers-spam | finance-keywords | hobbies-music-instruments |
| amounts-prefix | computers-video | finance-people | home-action |
| amounts-volume | craft-types | finance-realestate | home-appliances |
| animals-about | culture-ethnic | finance-verb | home-appliances-startswith |
| animals-action | culture-general | finance-verbing | home-decor |
| animals-bugs | culture-holidays | fishing-action | home-electronics |
| animals-cats | culture-religion | fishing-fishnames | home-family |
| animals-dogs | culture-spirituality | fishing-gear | home-furniture |
| animals-list | diet-general | food-action | home-kitchen-brands |
| animals-pets-others | diet-names | food-adjectives | home-materials |
| animals-problems | education-action | food-alcohol | home-parts |
| animals-supplies | education-classactivities | food-alcohol-main | home-rules |
| astrology-signs | education-degrees-types | food-bad | home-styles |
| astrology-unambiguous | education-disorders | food-breads-starches | home-tools |
| babies-supplies | education-general | food-condiments | home-utensils |
| bad-golf | education-grades | food-dairy | jewelry-brands |
| beauty-bodyparts | education-issues | food-desserts | jewelry-cuts-settings |
| beauty-brands | education-people | food-drink | jewelry-gemstones-metals |
| beauty-conditions | education-schoolplaces | food-ethnic | jewelry-modifiers |
| beauty-people | education-school-types-pl | food-events | law-courts |
| beauty-places | education-school-types-sng | food-fruit | law-crimes |
| beauty-products | education-subjects | food-herbs-spices | law-general |
| beauty-spa-equipment | education-supplies | food-howto | law-judges |
| beauty-treatments | education-teacher-resources | food-list-general | law-juries |
| beauty-verbing | education-testing | food-meat | law-lawyers |
| beauty-verbing-startswith | electronics-cameras | food-nutrition | law-politics |

FIG. 3A

| | | | |
|---|---|---|---|
| beauty-verbs | electronics-cellphones | food-places | law-types |
| beauty-verbs-startswith | endswith-food-desserts | food-prepared | med-bodyfunctions |
| cars-characteristics | endswith-food-list-general | food-vegetables | med-bodyparts |
| cars-make | ent-awards | games-cards | med-diseases |
| cars-model | ent-movies | games-general | med-diseases-endswith |
| cars-parts | ent-music-types | games-puzzles | med-diseases-incurable |
| cars-types | ent-tv | games-video | med-doctors |
| cars-year | environment | games-video-hardware | med-drugs |
| clothing-general | exclusions | garden-bad | med-drugs-deliverytypes |
| clothing-jewelry | exercise-activity | garden-basics | med-modifiers |
| colors-basic | exercise-brands | garden-broad | med-procedures |
| computers-action | exercise-equipment | garden-equipment | med-procedures-endswith |
| computers-brands | exercise-general | garden-features | med-supplements |
| computers-dev | exercise-martial-arts | garden-modifiers | med-symptoms |
| computers-extensions | exercise-muscles | garden-plants | med-types |

FIG. 3B

| | | |
|---|---|---|
| military-branches | places-us-nat-parks | words-adverbs |
| music-types | random-verbs | words-colors |
| names-actresses | restaurant-types | words-contractions |
| names-boys | retail-airlines | words-contractions-neg |
| names-domains | retail-fashion | words-dirty |
| names-girls | retail-general | words-emotions |
| outdoor-brands | retail-trains | words-ends-general |
| outdoor-disasters | science-space-entities | words-equipment |
| outdoor-entities | shopping | words-fixing |
| outdoor-for-outdoors | sports-awards | words-for |
| outdoor-gear | sports-bike-parts | words-foreign |
| outdoor-hazards | sports-common | words-ing-startswith |
| outdoor-people | sports-fishing-equip | words-intang-nouns |
| outdoors-not-trails | sports-fishing-fish | words-jobs |
| outdoor-trails-action | sports-golf-brands | words-junk |
| outdoor-verb | sports-golf-clubs | words-numbers-1-10 |
| outdoor-verbing | sports-golf-courses | words-numbers-Greaterthan10 |
| outdoor-verbing-startend | sports-golf-eqp | words-numbers-order |
| people-famous | sports-golf-related | words-personal |
| people-famous-endswith | sports-golf-verbs | words-preposition |
| people-golfers | sports-hunting | words-pronouns |
| people-jobs | sports-other | words-small |
| people-relationships | sports-teams | words-test |
| people-weddings | terms-realestate | words-that |
| pets-bad | test-damage | words-tips |
| pets-med-conditions | test-making | words-verb-ing |
| pets-med-drugs | test-testing | words-verb-phrases |
| phrasegroups-about | time-current | words-verbs |
| phrasegroups-advice | time-future | words-verbs-more |
| phrasegroups-amounts | time-holidays | words-verbs-startswith |
| phrasegroups-careers | time-units | yellowpages-mixed |

FIG. 3C

| | | |
|---|---|---|
| phrasegroups-characteristics | time-years | yellowpages-places |
| phrasegroups-history | travel-bad | yellowpages-service |
| phrasegroups-how | travel-currencies | yellowpages-travel |
| phrasegroups-methods | travel-equipment | yellowpages-travel-sng |
| phrasegroups-questions | travel-fares | |
| phrasegroups-rules | travel-festivals | |
| phrasegroups-words | travel-hotelchains | |
| places-cities-us | travel-people | |
| places-cities-world | travel-peoples | |
| places-countries | travel-sights-indoors | |
| places-information | travel-sights-outdoors | |
| places-states | travel-sights-startswith | |
| places-tourist-us | travel-types | |
| places-tourist-world | travel-vehicles | |
| places-us-golf-locales | visuals | |

FIG. 3D

| | | |
|---|---|---|
| a-advice | Contains | II-advice |
| a-amounts | Contains | A-measurements |
| a-characteristics | Contains | AA-characteristics |
| a-factsheet | Contains | AA-factsheet |
| a-how-it-works | Contains | A-howitworks |
| a-how-to | Contains | DD-howto |
| a-reviews | Contains | II-reviews |
| a-short-answer | Contains | AA-short_answer |
| a-strategy | Contains | DD-strategy |
| a-yes-no | Contains | AA-yes-no |
| aa-tips | Contains | DD-tips |
| abbreviations | Contains | AA-definition |
| about | Contains | AA-about,AA-factsheet |
| accommodations | Contains | executable, t-accommodations,TT-travel |
| accomodations | Contains | executable, t-accommodations,TT-travel |
| action | Contains | DD-action |
| activities | Contains | T-activities |
| activity | Contains | T-activities |
| address | Contains | Q-hyperlocal |
| adoption | Contains | T-adoption |
| advantages | Contains | I-pros_cons |
| advice | Contains | II-advice |
| affect | Contains | I-effects |
| age | Contains | I-amounts, A-facts |
| air-travel | Contains | TT-travel |
| alcohol | Contains | TT-food, t-drinks |
| almanac | Contains | A-facts |
| alternatives | Contains | I-options,d-substituting |
| amimals | Contains | TT-animals |
| amounts | Contains | I-amounts, A-facts, executable |
| analysis | Contains | AA-about |
| anatomy | Contains | T-body,AA-factsheet |
| animals | Contains | TT-animals |
| antiques | Contains | TT-hobbies |
| application | Contains | d-instructions, DD-strategy |
| apply | Contains | d-instructions, DD-strategy |
| art | Contains | T-art |
| astrology | Contains | TT-culture |
| attractions | Contains | T-places,TT-travel |
| automotive | Contains | TT-automotive |
| autumn | Contains | T-seasonal,Q-temporal |
| average | Contains | A-statistics |
| awards | Contains | T-awards |
| babies | Contains | T-babies,TT-family, t-kids |
| backgrounds | Contains | SET-visuals, TT-computers |
| bad | Contains | bad-delete |
| bankruptcy | Contains | TT-finance |

FIG. 4A

| | | |
|---|---|---|
| basics | Contains | A-explanations, AA-about |
| battles | Contains | AA-history |
| beaches | Contains | TT-travel, T-attractions |
| beauty | Contains | t-beauty |
| becoming | Contains | d-becoming, AA-factsheet |
| before | Contains | AA-factsheet |
| beginners | Contains | DD-tips |
| behavior | Contains | I-behavior |
| benefits | Contains | I-pros_cons, AA-factsheet |
| best | Contains | I-ratings, I-superlatives |
| biography | Contains | A-biography, AA-history, T-people, AA-about |
| blanktodoblank | Contains | DD-strategy |
| blueprints | Contains | SET-visuals |
| body | Contains | T-body |
| brands | Contains | set-retail |
| breeds | Contains | T-breeds, TT-animals |
| budgeting | Contains | TT-finance |
| bugs | Contains | TT-animals, t-bugs |
| building | Contains | d-making |
| business | Contains | T-business |
| buy | Contains | SET-shopping, T-sales |
| buyers | Contains | SET-shopping, T-sales |
| cabins | Contains | executable, t-accommodations |

FIG. 4B

| | | | |
|---|---|---|---|
| a-concepts (1) | i-amounts (41) | aa-about (2263) | d-becoming (8) | f-advice (17) |
| a-discoveries (4) | i-behavior (1) | aa-characteristics (261) | d-caring (94) | f-factsheet (263) |
| a-equipment (1) | i-choosing (40) | aa-factsheet (2488) | dd-action (3) | f-how to (4) |
| a-eras (1) | i-comparison (28) | aa-history (10) | dd-howto (78) | f-howto (48) |
| a-examples (1) | i-complications (2) | aa-list (81) | dd-strategy (132) | f-how-to (1) |
| a-explanations (51) | i-dangers (6) | aa-questions (197) | dd-tips (16) | f-list (407) |
| a-facts (1828) | i-effects (614) | aa-short_answer (98) | d-finding (20) | f-opinion (3) |
| a-famous (1) | i-guides (1) | aa-yes-no (55) | d-fixing (182) | f-other (1) |
| a-howitworks (13) | ii-advice (385) | | d-instructions (5) | f-process (16) |
| a-names (5) | ii-decisions (37) | | d-making (23) | f-review (1) |
| a-resources (3) | ii-reviews (27) | | d-methods (224) | f-shopping-review (1) |
| a-rules (5) | i-laws (2) | | d-recipes (2) | f-strategy-problems (194) |
| a-similarities (3) | i-needs (1) | | d-removing (5) | f-strategytip (1) |
| a-stages (4) | i-opinions (9) | | d-substituting (4) | f-tip (327) |
| a-statistics (3) | i-options (4) | | d-testing (6) | f-tips (3) |
| a-symptoms (1567) | i-prevention (8) | | d-treating (147) | |
| a-types (13) | i-problems (145) | | | |
| | i-pros_cons (6) | | | |
| | i-ratings (5) | | | |
| | i-safety (6) | | | |
| | i-solutions (1) | | | |
| | i-superlatives (29) | | | |

| | |
|---|---|
| t-teams (4) | tt-animals (151) |
| t-activities (7) | tt-careers (3) |
| t-babies (15) | tt-clothing (1) |
| t-beauty (211) | tt-computers (6) |
| t-body (674) | tt-culture (3) |
| t-bugs (13) | tt-education (30) |
| t-cats (29) | tt-entertainment (2) |
| t-diets (21) | tt-family (20) |
| t-doctors (8) | tt-finance (5) |
| t-dogs (75) | tt-fitness (10) |
| t-exercise (6) | tt-food (75) |
| t-fashion (1) | tt-gardening (23) |

| | |
|---|---|
| t-golf (1)<br>t-herbs (11)<br>t-insurance (1)<br>t-internet (1)<br>t-kids (20)<br>t-med_treatments (3024)<br>t-medical (3030)<br>t-men (12)<br>t-military (1)<br>t-movies (2)<br>t-nutrition (110)<br>t-people (101)<br>t-pets (138)<br>t-places (1)<br>t-plants (34)<br>t-pregnancy (120)<br>t-products (3)<br>t-relationships (205)<br>t-science (4)<br>t-services (41)<br>t-supplements (139)<br>t-trails (1)<br>t-training (1)<br>t-video (2)<br>t-women (161)<br>t-words (1) | tt-geography (1)<br>tt-hobbies (2)<br>tt-home (4)<br>tt-outdoors (25) |

RULE-BASED SYSTEM AND METHOD TO ASSOCIATE ATTRIBUTES TO TEXT STRINGS

RELATED APPLICATIONS

This application is a continuation application of U.S. patent application Ser. No. 12/828,200, filed Jun. 30, 2010 and entitled "Rule-Based System and Method to Associate Attributes to Text Strings", which claims priority to Prov. U.S. patent application Ser. No. 61/307,702, filed Feb. 24, 2010 and entitled "Rule-Based System and Method to Associate Attributes to Text Strings," the entire contents of which applications are hereby incorporated herein by reference.

FIELD OF THE TECHNOLOGY

At least some embodiments disclosed herein relate generally to the field of electronic information processing and, more particularly but not limited to, associating one or more attributes to text strings (e.g., search queries) that satisfy one or more conditions in a plurality of rules.

BACKGROUND

The Internet provides a convenient way to interact and to request various types of information. People can use the Internet, for example, to communicate with each other, share information, and organize virtual communities (e.g., a social network).

One way of requesting information using the Internet is by using a search tool on a web site (e.g., Google search service). Some search tools allow a user to search using a search query. For example, a user may enter a location and a query for "Italian restaurants" to identify Italian restaurants in a specified area or location. Various web sites, including some social networks, are able to accept search queries from users. A search query indicates the information that a user is seeking.

Search services typically log search queries executed on such services. These query logs can provide a rich source of information which can be mined to gain insight into topics that are of interest to users. Such information, however, can be voluminous, potentially involving millions of queries. The identification of matter of interest in such query logs can therefore, be greatly facilitated by automated processing.

BRIEF DESCRIPTION OF THE DRAWINGS

The embodiments are illustrated by way of example and not limitation in the figures of the accompanying drawings in which like references indicate similar elements.

FIGS. 2A-2B show an example of a set of rules and corresponding attributes to be added to matching search queries according to one embodiment.

FIGS. 3A-3D show exemplary dictionary lists used in search query processing according to one embodiment.

FIGS. 4A-4B show an exemplary list of attributes and their mappings to other attributes according to one embodiment.

FIGS. 5A-5B show exemplary tags or attributes for output search queries according to one embodiment.

DETAILED DESCRIPTION

Figure 1:
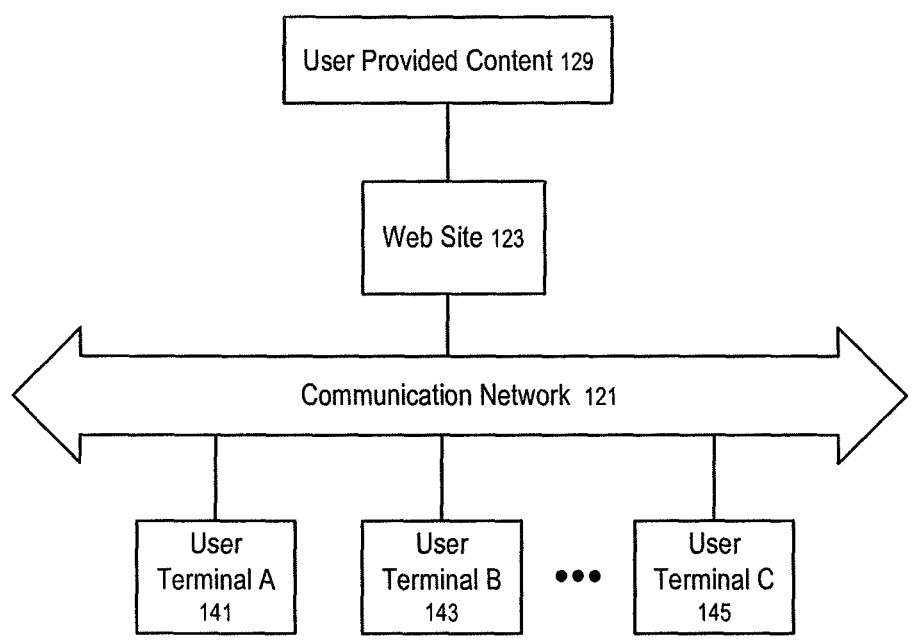
FIG. 1 shows a system including a web site accessible by user terminals according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Systems and methods to associate one or more attributes to text strings (e.g., search queries) that satisfy one or more conditions in a plurality of rules are described herein (e.g., use of these attributes and rules to select a title or to select a user recommendation). The disclosure includes methods and apparatuses which perform these methods, including data processing systems which perform these methods, and computer readable media containing instructions which when executed on data processing systems cause the systems to perform these methods. Other features will be apparent from the accompanying drawings and from the detailed description which follows.

In one embodiment, a title is selected for content (e.g., an article or video) to be published online. A method is implemented in a data processing system that includes receiving a plurality of text strings (e.g., search queries previously entered by users on affiliated websites). A plurality of rules are applied to the text strings, including parsing each of the respective text strings (e.g., into parts of speech) in order to apply the rules. Types of text strings may include, for example, a keyword phrase or a text string corresponding to an online search query previously received by a website.

If a condition specified in one of the rules exists in a given text string, one or more attributes (e.g., tags) are associated to that text string as metadata. One or more of the text strings are selected, using the metadata, as a potential title for the content. A final title is prepared based on the potential title, and the content is published online under the final title. For example, the final title may be prepared by further human editing of the potential title, by selection of the potential title by a human from a short list of possible titles, and/or by further transformative processing using additional linguistic or other rules. For example, in some embodiments, prior to publishing the content, the potential title may be transformed (e.g., further automatically modified or edited) in preparation for use as a final title using an additional, separate set of rules. One of these rules may associate a plurality of similar word variations with a single attribute that is then associated with the search query.

The online content to be published may include, for example, text, music, pictures, graphics, cartoons, audio narratives, videos, movies, and the like. The content may be published, for example, on a website accessible over the Internet and/or a private intranet. Other forms in which content may be published to be available for online access include, for example, blogs, real simple syndication (RSS) feeds, audio streams, video streams, File Transfer Protocol (FTP) sites, and the like.

In one embodiment, the content is created by freelance writers or content creators. A final title is sent to a creator with a request to author the content. The content is created to be consistent with the final title and to be consistent with predefined guidelines provided to the creator. Articles that are related may be provided as background information. Metadata, such as key words obtained from some of the text strings to which the rules have been applied may be provided to the creator for inclusion in the content. An editorial team may then approve the completed article prior to publication. The creator may be paid for the content based on actual online viewings by users of the Internet or other electronic forms of access.

In one embodiment, in order to determine desirable potential titles, search queries used by users may be obtained from a large number of various web sites. For example, search queries may come from a company's affiliated web sites, bulk data purchased from search engines, Internet marketing firms, and/or Internet Service Providers (ISPs).

FIG. 1 shows a system including a web site 123 accessible by user terminals according to one embodiment. In FIG. 1, the user devices or terminals (e.g., 141, 143, . . . , 145) are used to access a web site 123 over a communication network 121 (e.g., the Internet, a wide area network, or a local area network). The web site 123 may include one or more web servers (or other types of data communication servers) to communicate with the user terminals (e.g., 141, 143, . . . , 145).

The web site 123 may be connected to a data storage facility to store user provided content 129, such as multimedia content, or preference data, etc. Search queries or text strings received from users may be stored in the data storage facility.

In some embodiments, the web site 123 also may provide search results in response to a searching user's search query or other information request. For example, the web site 123 may select information that is most relevant based on the search query.

In other embodiments, web site 123 may receive text strings from many different sources. For example, web site 123 may be coupled via communication network 121 to other web sites or servers that receive search queries or text strings (e.g., from data provided manually or automatically by user devices). Web site 123 may be configured to automatically receive or periodically request these text strings, which are stored for text string processing as described below. For example, a data processing system may automatically receive a plurality of search queries previously submitted by users on a plurality of websites. The data processing system is communicatively coupled (e.g., by Internet connections) to receive search queries from each server associated with one of the websites. In some embodiments, the text strings are aggregated from existing content (e.g., numerous short articles or stories).

In yet other embodiments, web site 123 may be used to publish content having a final title based on selected potential titles as described herein. The final title is derived from a selected potential title. Humans may be presented with several potential titles using a user terminal in order to select the final title. Each presented potential title may have been selected using the rules approach described herein.

In another embodiment, prior to selecting a final title and publishing the content, the online monetization values of a potential title and one or more alternative titles is compared. In one embodiment, the monetization value of search titles can be represented as a lifetime value (LTV). Techniques for calculating the LTV of a potential title are described in detail in U.S. patent application Ser. No. 12/826,524, filed Jun. 29, 2010, entitled "System and Method for Evaluating Search Queries to Identify Titles for Content Production," the entire contents of which are incorporated by reference as if fully set forth herein. Techniques for calculating the LTV of search terms are described in detail in U.S. patent application Ser. No. 12/337,550, entitled "Method and System for Ranking of Keywords," the entire disclosure of which is included by reference herein in its entirety.

In some embodiments, a combination of client server architecture and peer to peer architecture can be used, in which one or more centralized server may be used to provide some of the information and/or services and the peer to peer network is used to provide other information and/or services. Embodiments of the disclosure are not limited to a particular architecture.

FIGS. 2A-2B show an example of a set of rules (listed in the leftmost column) and corresponding attributes (in the corresponding rows in the columns to the right) to be added to matching search queries according to one embodiment. Here, the attributes are Deliver, Intent, Query, and Tags. Here, the text strings are a plurality of search queries. These attributes are associated with a search query if a condition in a rule is satisfied (i.e., the rule "fires"). As an example, the rules may be implemented in various forms of expert systems.

In one embodiment, before the set of rules are applied, the search queries may be treated to a small extent. For example, this treatment may include correcting commonly misspelled words. Also, some text may be normalized. Many queries are very similar and share the same informational goals. Rules may be written for specific instances. For example, several search queries (e.g., "get rid of ants", "get rid ants", "how to get rid of ants") may be simplified into a single query (e.g., "How to Get Rid of Ants"). The rules are then applied to this single, treated query.

In one embodiment, the plurality of search queries (either fully un-structured, or as treated as discussed above) are parsed (e.g., the text is tokenized) and each search query is run against a subset or all of the rules. The parsing may include, for example, identifying one or more of the following: patterns in text strings, parts of speech, one or more specific words, and word combinations. These rules may contain one or more of the following: text strings, wildcards, word count, parts of speech, and dictionary matches. Rules may in some cases be fairly basic (e.g., look or test for one specific text string), or may be more detailed (e.g., look for multiple variables and conditions). Examples of various rules are described below.

Typically, the rules permit learning various types of information about the individual search queries, and further permit a selection of one or more search queries as potential titles (titles more or most likely to be turned into or used as final titles for published content). The rules are an input used to identify specific conditions and then to assign the relevant attributes as an output when those conditions are met. This input/output process may sometimes be referred to herein as the "Keyword Processor."

FIGS. 3A-3D show exemplary dictionary lists used in search query processing according to one embodiment. As mentioned above, some rules may test for the existence of one or more words from a search query that match a word in one or more dictionaries as defined in the particular rule. In one example, approximately 350 dictionaries (e.g., lists of words, text, numbers, and/or phrases) are used by the rules to discover, disambiguate and identify attributes of search queries. Many additional dictionaries may be used (e.g., thousands or potentially hundreds of thousands or more).

In some embodiments, disambiguation assists in determining what a word is referring to so that a decision can be made about the viability of the title and also its categorization. For example, the word "bills" could be a possessive noun/name, a financial document, a part of a hat, or a football team. Each of these contexts is significantly different, so knowing the meaning of "bills" that is intended by a person using it (e.g., a user doing a search) is helpful to selecting potential titles.

In one embodiment, dictionaries are named for reference. Dictionaries may be, for example, lists that contain one or more words or phrases, making it easier for rules to reference that group of words or phrases, without having to enumerate each and every one of those words or phrases repeatedly. Dictionaries may also contain further specifications than just the word or phrase itself. For example, the word or phrase may contain a wildcard character, symbolized by a % (percent sign) symbol, to serve as a substitute for any other text characters. For example, the text string "birth %" would match any word that merely started with the letters "b-i-r-t-h" such as "birthing", "births", "birthday", "birthdays", etc.

As one specific example, in FIG. 3A "babies-supplies" is one dictionary of many illustrated that may be referenced by a rule. For this particular dictionary, a rule may look for the word "baby" (or alternatively, babies, infant, infants, etc.) and in addition also look for another one of the many ambiguous words in the "babies-supplies" dictionary in order to infer that the search query is indeed about a product for babies. The foregoing may also be combined with other common words in another dictionary that lists shopping-related words in order to conclude that the query is transactional in nature and topically about baby supplies.

In some embodiments, dictionaries may consist of ambiguous and/or unambiguous words that share a general or specific theme. For example, the three dictionaries cars-make, cars-model, cars-year may include the following entries:

| cars-make | cars-model | cars-year |
| --- | --- | --- |
| Acura | Acadia | 01 |
| Alfa Romeo | Accent | 02 |
| Audi | Acclaim | 03 |
| Bentley | Accord | 04 |
| BMW | Achieva | 05 |
| Buick | Aerio | 06 |
| Cadillac | Aerostar | 07 |
| Chevrolet | Alero | 08 |
| Chrysler | Allante | 09 |
| Daewoo | allroad | '01 |
| Daihatsu | Alpina | '02 |
| Dodge | Altima | '03 |
| Eagle | Amanti | '04 |
| Ferrari | Amigo | '05 |
| Ford | APV | '06 |
| Geo | Aries | '07 |
| GM | Armada | '08 |
| GMC | Ascender | '09 |

-continued

| cars-make | cars-model | cars-year |
| --- | --- | --- |
| Honda | Aspen | 2001 |
| Hummer | Aspire | 2002 |

Now discussing rules and attributes in more detail, when the conditions of a rule are met, descriptive attributes get appended to matching search queries. A few types of attributes are now discussed below. In one embodiment, the attributes associated with a search query may be one or more of the following: one or more text tags; an indication of intent; a query type; an indication of suitability for use as a title; or one or more "extracted tags" (e.g., text extracted from a search query when and in response to a rule being satisfied, as discussed further below).

The query types may include, for example, the following types: informational, transactional, and navigational. For example, in a search context these are conventional type names that refer to informational goals sought by users of search engines. The following are specific examples of certain types: (i) the informational type typically relates to what persons want (e.g., people looking for information about something); (ii) the transactional type typically relates to shopping (e.g., "Tickets to New York"); and (iii) the navigational type typically relates to searches in which a person is looking for a website (e.g., "Google" or "best buy web site" or "best buy Austin texas").

Regarding the Deliver attributes, queries marked with "Y" (e.g., see FIG. 2A) are to be sent for further human review and editing; these queries generally have a much higher likelihood of being turned into final titles (e.g., 60-70% probability). Queries marked with an "N" are specifically undeliverable or unusable as a title because the search query has been identified as containing an undesirable element (e.g., as listed in a predefined list of undesirable elements).

Regarding the Intent attributes, queries marked with a "Y" attribute have clear and discernable intent (i.e., the person that submitted the search query had an intent to do something as discerned by one or more rules). Queries marked with an "N" attribute specifically lack clear intent. In one embodiment, only queries that are marked Deliver=Y and Intent=Y will be used as potential titles. In other embodiments, the remaining queries not so marked may be used for other purposes such as general Topic Pages or other forms of content (e.g., pictures, downloads, etc.).

Regarding the Query attributes, one or more rules identify if the search query fits into the three main types of search: Informational, Transactional or Navigational. The query is marked with the appropriate attribute.

Regarding the Tags attributes: tags may be free-form text used to identify other attributes of search queries. Various exemplary tag attributes may be used as follows:

1. Topical tags (e.g., pets, home, kids, health, etc.)
2. Type tags: objective (e.g., history or instructions) and subjective (e.g., reviews or advice) groupings
3. Action tags (e.g., building, repairing, finding, etc.)
4. Format tags: search query matches a potential title with a predefined template Regarding the Extracted Tags attributes, specific, individual words are extracted from relevant rules-fired dictionaries (i.e., the one or more dictionaries for which a rule's condition has been satisfied). The words are automatically appended as additional information to the search query. An extracted tag differs from a tag above in that the appended word is extracted from the search query itself in response to at least one rule condition involving a dictionary being satisfied. In contrast, the tags above append a word as additional information to the search query that was pre-defined in the rule itself.

In one embodiment, a first plurality of rules to be applied includes a first rule. If a condition specified in the first rule exists in a search query, one or more words are extracted from the first search query. The one or more extracted words are associated with the search query as one or more attributes (i.e., extracted tags).

In one example regarding the use of dictionaries, the car dictionaries discussed earlier above are used in the following example rule:

| Rule | Deliver | Intent | Query | Tags |
|---|---|---|---|---|
| InDictionary(2, "cars-make", "cars-model", "cars-year") | — | — | — | cars |

This rule states that if a search query contains at least one word from each of at least two of the dictionaries listed (make+model, make+year, or model+year), then it is highly likely that the search query is about a specific car. For example, in the absence of any specific context the word "cherokee" might possibly refer to several different meanings. However, when accompanied by "jeep" or "2003", the word "cherokee" almost always refers to a car model.

This particular rule only adds the "cars" tag, because the author of the rule determined that this is all that is that can be known from the conditions in that rule. However, multiple rules can apply or fire for any given query, and the attributes may sometimes overlap to form an automated, improved source of intelligence about the search queries.

Additional rules leveraging previously-applied rules may also be added to form a chain reaction of rules. As an example, consider the following:

| Rule | Deliver | Intent | Query | Tags |
|---|---|---|---|---|
| InDictionary(2, "cars-make", "cars-model", "cars-year") | — | — | — | cars |
| HasTag("cars") AND InDictionary("words-fixing") | Y | Y | I | cars, problems, fixing |

The second rule above states that if a query has already been given the tag "cars" and it also contains a word/phrase from the "words-fixing" dictionary, then the following characteristics are likely: the matching search query should be considered further by human editors as a potential title, the query is very likely to have intent, and the query expresses an informational goal.

In another example, the output for the search query, "1999 dodge intrepid 3.2 clicking sound when turn key", would return the following metadata:

| | |
|---|---|
| Deliverable | Y |
| Intent | Y |
| Tags | repairing; problems; specific; automotive |
| Extracted Tags | % ing sound %; 1999; Dodge; Intrepid |
| Rules Fired | InDictionary(2, "cars-make", "cars-model", "cars-year") AND ContainsPos("RB VB %", "WRB") InDictionary(2, "cars-make", "cars-model", "cars-year") AND InDictionary("words-fixing") InDictionary(2, "cars-make", "cars-model", "cars-year") |

The first rule listed in the "Rules Fired" section in the table above uses parts of speech combined with dictionary words and combinations as its criteria.

The various forms of metadata described above may be used, for example, in various ways. Some example uses are as follows:

1. Begin processing the search query as a title
2. Use tags to group this title with other titles that are also about, for example, one of the following:
   a. Automotive
   b. Problems
   c. Repairing
   d. Automotive+Problems
   e. Automotive+Problems+Repairing
3. Use tags and extracted tags to group other titles together (e.g., in topic pages or automated recommendations)
   a. All titles about Repairing+Dodge+Intrepid
   b. All titles about Automotive+Problems+_____ing sounds
   c. All titles about 1999+Dodge+Intrepid FIGS. 4A-4B show an exemplary list of attributes and their mappings to other attributes according to one embodiment. After applying the rules and associating tags to queries as described above, in some embodiments additional post-processing may be used. One form of post-processing that may be used is tag mapping, in which associated tags are mapped to new tag values. Such mapping may allow automatically shaping tags, such as for the following:

1. Consistency: Misspellings and spacing issues due to disparate work by multiple analysts may be corrected. For example, "cars", "auto", "autos", and "automotive" all may be mapped to a single "automotive" tag.
2. Organization: Tags may be name-spaced with prefixes (e.g., "D-", "T-", etc.) to group like tags together into one or more categories. For example, all action tags like "fixing", "making", "installing", etc., may be assigned a "D-" prefix indicating that these tags have something in common with each other (in this example, the D-tags are all action-based concepts). Prefix namespaces may also be used to create an ad-hoc hierarchy (e.g., "T-software" is a type of "TT-computers"). This ad-hoc hierarchy may be used, for example, to see or use a category (e.g., "computers") after it has been broken down into more detail (e.g., "software" and "hardware").
3. Hiding/Showing More Detail: Tags may be mapped to hide currently unnecessary details (i.e., detail not needed for an existing title selection process), but the detail may be retained as hidden associated tags and shown or used later if the need arises. For example, the tags "chemistry", "biology" and "science fair" may all be mapped to a "Science" tag because no further tag is necessary in the existing process. In a later process, those tags can be reverse-mapped so that the higher-level, general "Science" tag is comprised of the now visible, science-specific tags.

FIGS. 4A-4B show a section of a tag-mapping table where tags in the left column get mapped to the tags in the right column. The word "contains" in the table indicates a correspondence, and this may be used for programmatic purposes (e.g., in a program to instruct a data processing system to look for instances of a particular word in the left column).

For example, the tag "age" is mapped, as shown in FIG. 4A, to the new tag values "I-amounts" and "A-facts". The tag "age" may have been used extensively throughout the plurality of rules, but rather than modifying each rule, tag-mapping may be used to change the tag attached to relevant queries in a separate step. As the table indicates, the "age" tag was modified to represent two different attributes of the matching queries: (i) an "amount" of something is likely being sought by the searcher; and (ii) those matching queries are seeking factual information.

As a specific example of the organization of attributes into categories, consider an action category and an item category. Attributes such as buying, using, fixing, identifying, and creating may be organized into the action category. Attributes such as computers, pets, home, health, and sports may be grouped together since these attributes describe the topical nature of the query. Search queries may be selected based on the selection of an attribute from the action category and the selection of an attribute from the item category. The data processing system then may identify search queries having both of these attributes (and also other attributes). The set of identified search queries may be used for further processing and/or presented to a user on a display for manual review and/or initiating other action.

In one embodiment, the data processing system stores a first list of attributes in a first category, and the metadata includes a first attribute chosen from the first category. A second list of attributes may be stored in a second category, and the metadata may also include a second attribute chosen from the second category. The first category may correspond to intended actions and the second category may correspond to items.

In some embodiments, search queries may be sorted in numerous ways based on selected attributes and/or selected categories. For example, to assist in selecting a search query, the search queries may be sorted based on a combination of two or more attributes (e.g., a logical AND combination, or even more complicated logical combinations).

In yet other embodiments, rules may be chained so that the combination of two attributes leads to the addition of yet another attribute. For example, search queries previously submitted by users on other websites may be received. A first plurality of rules is applied to the search queries. The first plurality of rules includes a first rule, a second rule, and a third rule.

If a condition specified in the first rule exists in a first search query of the plurality of search queries, a first word is extracted from the first search query. If a condition specified in the second rule exists in the first search query, a second word is extracted from the first search query. Finally, if a condition that is dependent upon the first word and the second word, specified in the third rule exists in the first search query, an attribute is associated to the first search query. The associated attribute is used as part of the process of selecting one of the search queries (e.g., as a potential title for online content or as an online recommendation).

FIGS. 5A-5B show exemplary tags or attributes for search queries that are provided as output from the text string rules processing described above according to one embodiment. The illustrated tags are grouped using prefixes "a-", "i-", etc., as discussed above. The search queries may be used, for example, in further post-processing analysis (e.g., as discussed herein). This analysis may be based, for example, on selections by a user of certain specific ones of these tags in order to present (e.g., on a display of a user terminal) various selections and organizations of search queries to the user (e.g., a user that is studying the search queries to discern useful patterns or correlations of information or to create additional rules for future use).

A specific, non-limiting example of the use of a set of rules to process search queries in one embodiment is now discussed below. A large number of unstructured search queries (e.g., tens to hundreds of millions or more) are received by a data processing system. Rules are applied to associate attributes to search queries as discussed above. Note that some search queries may not have any attribute associated if no rule is satisfied for the query.

Processing of the search queries is performed to assess the nature and type of the inquiries being made by the users that submitted the queries. This processing includes the following:

1. Disambiguate common words that could reasonably relate to multiple topics (e.g., arm as part of the body or ARM as a type of mortgage)
   a. Use custom dictionary lists and accompanying rules to disambiguate the queries (e.g., if arm [body part] appears in the same query as swelling [medical symptom], then the word arm is very likely referring to a body part).
2. Using dictionary lists, text strings, parts of speech, word counts, and other conditions, use rules to infer at least one element of a search query and tag appropriately with one or more of the following:
   a. Type of query, including but not limited to:
   i. Query is a question
   ii. Query expresses a problem
   b. Goal of query, including but not limited to:
   i. fact
   ii. opinion
   iii. instruction
   c. Topic of query (e.g., sometimes one level deep, other times many levels down)

| |
| --- |
| Health |
| Human |
| Medical |
| Symptoms |
| Swelling |
| Body part |
| Arm |

Next, certain search queries are selected as potential titles that could be turned into final content titles. For example, several thousand potential titles might be selected from millions of input search queries. Based on the associated tags and other characteristics, another layer of tags may also be associated with the search queries using rules that relate to the following aspects of a query:

1. Intent (e.g., frozen strawberries versus freezing strawberries)
   a. The likelihood of a query being an information-based title, suitable for creating content around the query, may be assessed based on the following traits:
   i. Individual words
   ii. Text strings
   iii. Placement of words or text strings in the query
   iv. Part of speech strings
   v. Placement of parts of speech strings in the query
2. Deliverability
Assess whether a potential title is likely to be consistent with predefined editorial standards and requirements (e.g., a policy manual provided to a contractor hired to review potential titles in order to select a final title).

3. Query type
   a. Informational
   b. Transactional
   c. Navigational

Particular combinations of the above tags may be utilized as an additional indicator of the viability of a query to be used as part of a specific group of potential titles.

Selected search queries may next be transformed to prepare content titles. Many queries are similar and share common informational goals. Rules may be encoded for rewriting queries into more desirable forms.

In other embodiments, the metadata as discussed above may be used to assess how similar types of content perform (e.g., perform when used as a title) regardless of its topical attributes. For example, the performance of titles about "repairing" relative to "installing" may be assessed, or the performance of "advice"-based titles relative to fact-based titles may be assessed. The methods described above may be used to analyze this kind of information.

In other embodiments regarding related content, based on various tags, intelligence may be applied based on the tags to suggest related content to a user (e.g., to make recommendations regarding related content). For example, a user reading online published content about "How to Repair the Brake System in a 1993 Honda Accord" is likely not interested in reading about repairing brakes in any other car, but is more likely interested in other titles that share, for example, the following tags: "auto+repair+Honda+Accord"; or "Honda+Accord+brakes".

In yet other embodiments, contextual and semantic metadata is automatically added to text strings (e.g., search queries, or groups of existing web page titles). A rule-based expert system parses text strings and looks for specific, predefined text patterns, parts of speech, words and word list combinations. These patterns may range from basic and explicit to complex and implicit, conditional patterns.

The rules are written as implied if/then statements; if a defined condition exists in a search query, for example one to a dozen or more attributes (and kinds of attributes) are added to that query as metadata. This metadata provides improved understanding of the search query (e.g., topic, search goal, search strategy and more may exist in the metadata, which may be further categorized by the kind of attributes the metadata represents).

In one embodiment, a software process may be used to analyze the resulting output metadata using combinations or permutations of the search query data and metadata. As a result, one is able to browse search queries by any or all of their associated attributes. This may allow finding other, different groups of desirable search queries, which may then be used to inform content strategy and production of content. This metadata and software process may also be used to find other, unobvious correlations in very large datasets of search queries or web page titles. This may go beyond topical categorization or other usually available data.

In alternative embodiments, the text strings to be processed may be existing titles that have already been used for published content. Further, one of these titles may be selected to be used as a recommendation or as related content (e.g., presented to a user visiting an informational or shopping website). The recommendation or related content may be provided to a user device that is accessing a website.

In other embodiments, the text strings to be processed are obtained from an existing online shopping website (e.g., text strings obtained from search queries or product purchase requests entered by a shopper on the website), and one of the text strings is selected to be used as a recommendation for a different online shopping website. The recommendation is provided to a user device of a user accessing the different shopping website.

Figure 6:
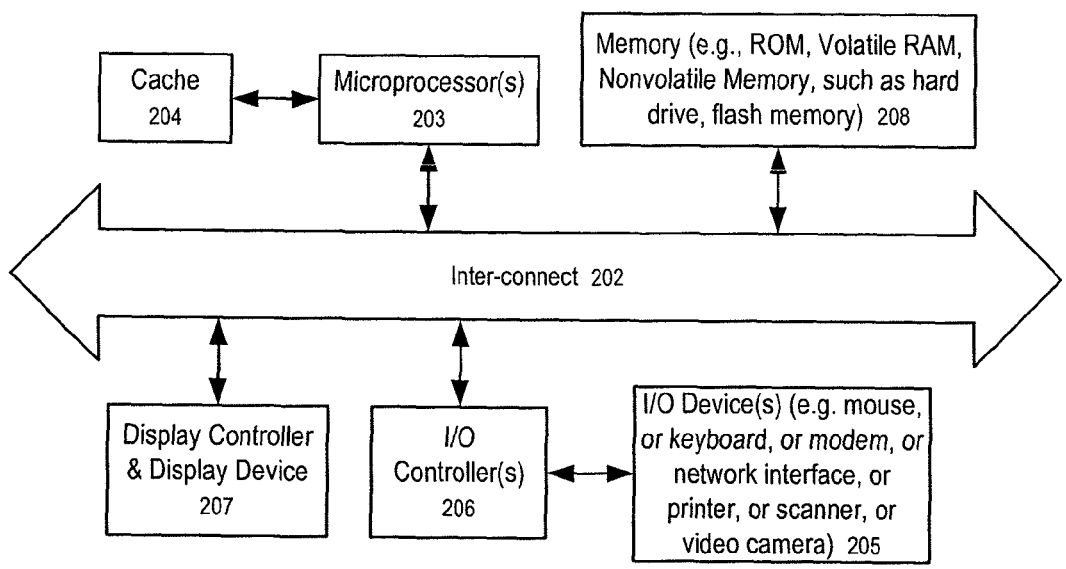
FIG. 6 shows a block diagram of a data processing system which can be used in various embodiments.

FIG. 6 shows a block diagram of a data processing system which can be used in various embodiments to implement the application of rules to text strings as discussed above. While FIG. 6 illustrates various components of a computer system, it is not intended to represent any particular architecture or manner of interconnecting the components. Other systems that have fewer or more components may also be used.

In FIG. 6, the system (201) includes an inter-connect (202) (e.g., bus and system core logic), which interconnects a microprocessor(s) (203) and memory (208). The microprocessor (203) is coupled to cache memory (204) in the example of FIG. 6.

The inter-connect (202) interconnects the microprocessor(s) (203) and the memory (208) together and also interconnects them to a display controller and display device (207) and to peripheral devices such as input/output (I/O) devices (205) through an input/output controller(s) (206). Typical I/O devices include mice, keyboards, modems, network interfaces, printers, scanners, video cameras and other devices which are well known in the art.

The inter-connect (202) may include one or more buses connected to one another through various bridges, controllers and/or adapters. In one embodiment the I/O controller (206) includes a USB (Universal Serial Bus) adapter for controlling USB peripherals, and/or an IEEE-1394 bus adapter for controlling IEEE-1394 peripherals.

The memory (208) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 6 is used to implement one or more affiliated web sites. In other embodiments, the data processing system is used to store rules and apply them to text strings as described herein.

In another embodiment, a data processing system as illustrated in FIG. 6 is used to implement a user terminal, which may receive a search query from a user. A user terminal may be in the form of a personal digital assistant (PDA), a cellular phone, a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) (203) and/or the memory (208). For example, the functionalities described can be partially implemented via hardware logic in the microprocessor(s) (203) and partially using the instructions stored in the memory (208). Some embodiments are implemented using the microprocessor(s) (203) without additional instructions stored in the memory (208). Some embodiments are implemented using the instructions stored in the memory (208) for execution by one or more general purpose microprocessor(s) (203). Thus, the disclosure is not limited to a specific configuration of hardware and/or software.

Figure 7:
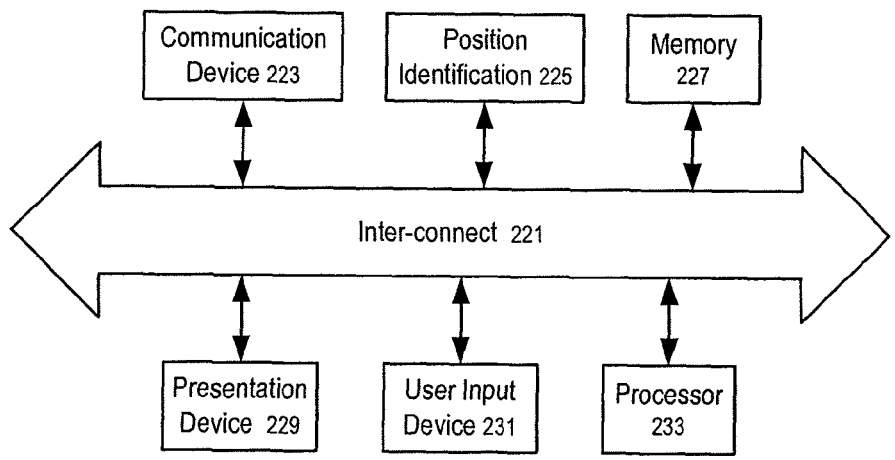
FIG. 7 shows a block diagram of a user device according to one embodiment.

FIG. 7 shows a block diagram of a user device according to one embodiment. In FIG. 7, the user device includes an inter-connect (221) connecting the presentation device (229), user input device (231), a processor (233), a memory (227), a position identification unit (225) and a communication device (223).

In FIG. 7, the position identification unit (225) is used to identify a geographic location for user content sent to web site 123. The position identification unit (225) may include a satellite positioning system receiver, such as a Global Positioning System (GPS) receiver, to automatically identify the current position of the user device.

In FIG. 7, the communication device (223) is configured to communicate with a web site or an online social network to provide user data or content. A response to a search query, or published content for viewing by a user, can be presented at least in part via the processor (233) and the presentation device (229).

In one embodiment, the user input device (231) is configured to generate user data content which is to be tagged with data provided by the user. The user input device (231) may include a text input device, a still image camera, a video camera, and/or a sound recorder, etc.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
receiving, in a computing apparatus from a first computing device, a plurality of text strings, each of the text strings identifying a separate search query, wherein the text strings are from search queries previously entered by users on a first plurality of computing devices;
applying, by the computing apparatus, each respective rule of a first plurality of rules to each respective text string of the plurality of text strings, including
determining whether the respective text string satisfies a condition of the respective rule, wherein the condition of at least one respective rule is determined to be satisfied by the respective text string in response to a determining the respective text string includes a predetermined text pattern specified for the respective rule;
in response to a determining the respective text string satisfies the condition of the respective rule, associating a set of metadata of the respective rule with a search query identified by the respective text string;
sorting, by the computing apparatus, the plurality of text strings based at least in part on metadata associated with the search queries via the applying of the first plurality of rules;
identifying, by the computing apparatus, a potential title based on the sorting of the plurality of text strings;
providing, by the computing apparatus to a second computing device, the potential title for use in creating content, the providing further comprising providing key words obtained from the plurality of text strings, wherein the second computing device is different from the first computing device;
receiving, from the second computing device, the created content, wherein the created content includes the key words;
transforming the potential title to generate a final title using a second plurality of rules; and
publishing, by the computing apparatus, the created content under the final title, wherein the publishing provides access via a website to a second plurality of computing devices, and the second plurality of computing devices is different from the first plurality of computing devices.

2. The method of claim 1, wherein the content is created in accordance with the potential title and predefined guidelines.

3. The method of claim 2, further comprising:
arranging, by the computing apparatus, the creation of the content by at least one author.

4. The method of claim 1, wherein the condition of at least one respective rule is determined to be satisfied by the respective text string in response to a the respective text string has a predetermined part of speech specified for the respective rule.

5. The method of claim 1, wherein the condition of at least one respective rule is determined to be satisfied by the respective text string in response to a the respective text string has one or more predetermined words specified for the respective rule.

6. The method of claim 1, wherein the condition of at least one respective rule is determined to be satisfied by the respective text string in response to a the respective text string has a predetermined word combination specified for the respective rule.

7. The method of claim 1, wherein the set of metadata includes one or more tags.

8. The method of claim 1, wherein the set of metadata includes indication of intent of the respective text string.

9. The method of claim 1, wherein the set of metadata identifies a query type of the respective text string.

10. The method of claim 1, wherein the query type is one of:
informational, transactional, or navigational.

11. The method of claim 1, wherein the set of metadata includes indication of suitability of the respective text string as a title.

12. The method of claim 1, wherein the second plurality of rules comprises at least one rule that associates a plurality of similar word variations with a single attribute.

13. The method of claim 1, wherein applying the first plurality of rules to the plurality of text strings comprises identifying patterns in text strings, parts of speech, one or more specific words, and word combinations.

14. The method of claim 13, wherein identifying one or more specific words comprises identifying one or more words found in one or more dictionaries.

15. A non-transitory computer readable storage media storing thereon computer readable instructions, when executed by a computing apparatus, cause the computing apparatus to perform a method, the method comprising:
receiving, in the computing apparatus from a first computing device, a plurality of text strings, each of the text strings identifying a separate search query, wherein the text strings are from search queries previously entered by users on a first plurality of computing devices;
applying, by the computing apparatus, each respective rule of a first plurality of rules to each respective text string of the plurality of text strings, including
determining whether the respective text string satisfies a condition of the respective rule, wherein the condition of at least one respective rule is determined to be satisfied by the respective text string in response to a determining the respective text string includes a predetermined text pattern specified for the respective rule;
in response to a determining the respective text string satisfies the condition of the respective rule, associating a set of metadata of the respective rule with a search query identified by the respective text string;
sorting, by the computing apparatus, the plurality of text strings based at least in part on metadata associated with the search queries via the applying of the first plurality of rules;
identifying, by the computing apparatus, a potential title based on the sorting of the plurality of text strings;
providing, by the computing apparatus to a second computing device, the potential title for use in creating content, wherein the second computing device is different from the first computing device;
receiving, from the second computing device, the created content;
transforming the potential title to generate a final title using a second plurality of rules; and
publishing, by the computing apparatus, the created content under the final title, wherein the publishing provides access via a website to a second plurality of computing devices, and the second plurality of computing devices is different from the first plurality of computing devices.

16. A computing apparatus, comprising:
at least one processor; and
memory storing instructions, which when executed, cause the at least one processor to:

receive, in the computing apparatus from a first computing device, a plurality of text strings, each of the text strings identifying a separate search query, wherein the text strings are from search queries previously entered by users on a first plurality of computing devices;

apply, by the computing apparatus, each respective rule of a first plurality of rules to each respective text string of the plurality of text strings, via determining whether the respective text string satisfies a condition of the respective rule, wherein the condition of at least one respective rule is determined to be satisfied by the respective text string in response to a determining the respective text string includes a predetermined text pattern specified for the respective rule;

in response to a determining the respective text string satisfies the condition of the respective rule, associating a set of metadata of the respective rule with a search query identified by the respective text string;

sort, by the computing apparatus, the plurality of text strings based at least in part on metadata associated with the search queries via the first plurality of rules;

identify, by the computing apparatus, a potential title based on sorting the plurality of text strings;

provide, by the computing apparatus to a second computing device, the potential title for use in creating content, wherein the second computing device is different from the first computing device;

receive, from the second computing device, the created content;

transform the potential title to generate a final title using a second plurality of rules; and publish, by the computing apparatus, the created content under the final title, wherein the publishing provides access via a website to a second plurality of computing devices, and the second plurality of computing devices is different from the first plurality of computing devices.

* * * * *